United States Patent
Zhu et al.

(10) Patent No.: US 9,281,122 B2
(45) Date of Patent: Mar. 8, 2016

(54) ELECTRODE STRUCTURE OF A LAMINATED METALLIZATION FILM CAPACITOR

(75) Inventors: Jian Zhu, Xiamen (CN); Jintao Lin, Xiamen (CN); Guobin Chen, Xiamen (CN)

(73) Assignee: XIAMEN FARATRONIC CO., LTD., Xiamen (CN)

( * ) Notice: Subject to any disclaimer, the term of this patent is extended or adjusted under 35 U.S.C. 154(b) by 92 days.

(21) Appl. No.: 14/362,684

(22) PCT Filed: Aug. 15, 2012

(86) PCT No.: PCT/CN2012/080132
§ 371 (c)(1),
(2), (4) Date: Jun. 4, 2014

(87) PCT Pub. No.: WO2013/082951
PCT Pub. Date: Jun. 13, 2013

(65) Prior Publication Data
US 2014/0301019 A1  Oct. 9, 2014

(30) Foreign Application Priority Data

Dec. 7, 2011  (CN) .......................... 2011 1 0408341

(51) Int. Cl.
*H01G 4/005* (2006.01)
*H01G 4/01* (2006.01)
*H01G 4/30* (2006.01)
*H01G 4/33* (2006.01)
(Continued)

(52) U.S. Cl.
CPC ................. *H01G 4/01* (2013.01); *H01G 4/005* (2013.01); *H01G 4/012* (2013.01); *H01G 4/30* (2013.01); *H01G 4/33* (2013.01); *H01G 4/14* (2013.01)

(58) Field of Classification Search
CPC ......... H01G 4/005; H01G 4/012; H01G 4/30; H01G 4/33
USPC ................... 361/301.1, 301.4, 303, 304, 305, 361/311–313
See application file for complete search history.

(56) References Cited

U.S. PATENT DOCUMENTS 4,890,192 A * 12/1989 Smith ..................... H01L 28/40
257/506
6,120,912 A * 9/2000 Sawada ................ C01G 33/006
106/1.05
8,564,929 B2 * 10/2013 Ito .......................... H01G 4/224
361/301.2
(Continued)

FOREIGN PATENT DOCUMENTS

CN  201374252 Y  12/2009
CN  201449904 U  5/2010
(Continued)

*Primary Examiner* — Nguyen T Ha
(74) *Attorney, Agent, or Firm* — Rabin & Berdo, P.C.

(57) ABSTRACT

An electrode structure of a laminated metallization film capacitor includes at least two laminated metallization films. Each metallization film is further disposed with a plurality of metal-uncoated curved gap strips with a certain width on the plane of section of the laminated metallization film capacitor core to separate two adjacent metal coating units partially or totally. A center of the curved gas strip is concaved with a notch. Both sides of the notch form like misaligned shoulders. A projection forms opposite to the open of the notch; in two adjacent curve gap strips. An extreme point of the projection of one curve gap strip is disposed inside the notch of the other one in any event.

10 Claims, 11 Drawing Sheets

(51) Int. Cl.
*H01G 4/012* (2006.01)
*H01G 4/14* (2006.01)

(56) References Cited

U.S. PATENT DOCUMENTS 8,654,503 B2 * 2/2014 Baucom .................. H01G 4/32
361/301.5

8,861,178 B2 * 10/2014 Terashima ............. H01G 4/306
361/301.2
9,111,690 B2 * 8/2015 Motoki .................. H01C 1/148

FOREIGN PATENT DOCUMENTS

CN 102543438 A 7/2012
WO WO-2011073401 A1 6/2011

* cited by examiner

ELECTRODE STRUCTURE OF A LAMINATED METALLIZATION FILM CAPACITOR

FIELD OF THE INVENTION

The present invention relates to electrical components, especially to an electrode structure of a laminated metallization film capacitor.

BACKGROUND OF THE INVENTION

Film capacitors are one kind of capacitors that have outstanding performance, which has following main characters: non-polarity, high insulation resistance, outstanding frequency response (wide frequency response), less dielectric loss. As the film capacitors have small size and large capacity, they are used widely to transform into different product series, for example, high specific power storage capacitors, anti-EMI capacitors, anti-irradiation capacitors, safety film capacitors, long service capacitors, high reliable capacitors, high pressure all film capacitors and so on.

Thin film capacitors are made from metallization films, the metallization film is formed from a plastic film vacuum deposited with a thin metal layer, the metal layer is served as electrode.

In existing technology, two or more than two metallization films and (or) a plurality of optical films are wound into a large capacitor core by winding device, after some manufacturing procedures including metal spraying, the large capacitor core is cut into laminated capacitor cores by cutter, finally the laminated capacitor cores are used to make capacitors. This kind of laminated metallization film capacitor has disadvantages: on the plane of section of the capacitor core, the insulation distance between metallization electrodes in different potentials is the thickness of the dielectric between electrodes, the thickness is from several to dozens of μm, the withstand voltage property on the plane of section is weak only relying on the coating material thereon to insulate.

SUMMARY OF THE INVENTION

The object of the present invention is to overcome the disadvantages of the existing technology and provide with an electrode structure of a laminated metallization film capacitor, by designing a special electrode structure, enlarging the insulation distance of metallization electrodes in different potentials on the plane of section of the capacitor core, thus improving the withstand voltage of the plane of section of the laminated metallization film capacitor core.

The technical proposal of the present invention to solve the technical problems is; An electrode structure of a laminated metallization film capacitor, comprising at least two laminated metallization films; two adjacent metallization films are laminated with a preset misalignment width longitudinally; each metallization film respectively comprising a conductive metal coating and an insulation dielectric layer, the conductive metal coating is film coated on the insulation dielectric layer; each metallization film is disposed with at least a metal-uncoated gap strip with a certain width laterally, the gap strip forms a margin of the metallization film; wherein:

each metallization film is further disposed with a plurality of metal-uncoated curved gap strips with a certain width on the plane of section of the laminated metallization film capacitor core to separate two adjacent metal coating units partially or totally; a center of the curved gas strip is concaved with a notch, both sides of the notch form like misaligned shoulders, a projection forms opposite to the open of the notch; in two adjacent curve gap strips, an extreme point of the projection of one curve gap strip is disposed inside the notch of the other one in any event.

The opens of notches of the curved gap strips in two adjacent upper and lower metallization films are faced in a same direction or in opposite direction, that is to say the notches face to a same direction or a different direction.

In two adjacent upper and lower metallization films, the metal coating of the upper metallization film is connected to a first electrode, the metal coating of the lower metallization film is connected to a second electrode, a preset distance is disposed between the first electrode and the second electrode on the plane of section.

The width of each curved gap strip is equal or unequal, the width of the each curved gap strip is greater than or equal to 0.1 mm; that is to say, the curved gap strips have equal or unequal width, the width is greater than or equal to 0.1 mm.

The curved gap strip comprises a first curved gap strip, a second curved gap strip, a third curved gap strip and a fourth curved gap strip joined in order as one.

The curved gap strips are disposed on the plane of section of the laminated metallization film capacitor core, the plane of section and the longitudinal direction set at a preset angle, when the preset angle is distorted reversely on the plane of section and the curved gap strips, the plane of section and the longitudinal direction coincide, the first curved gap strip, the second curved strip, the third curved strip and the fourth curved gap strip match any of the following:

the fourth curved gap strip is a curved section from a preset position of the curved gap strip to the margin of the metallization film, the second curved gap strip is a curved section from a leftmost end point of a curved gap strip section removing the fourth curved gap strip to a rightmost end point thereof;

The advantages of the present invention is that: as each metallization film is further disposed with a plurality of metal-uncoated curved gap strips with a certain width on the plane of section of the laminated metallization film capacitor core to separate two adjacent metal coating units partially or totally; a center of the curved gas strip is concaved with a notch, both sides of the notch form like misaligned shoulders, a projection forms opposite to the open of the notch; in two adjacent curve gap strips, an extreme point of the projection of one curve gap strip is disposed inside the notch of the other one in any event. This kind of structure makes it enlarging the insulation distance of metallization electrodes in different potentials on the plane of section of the capacitor core, thus improving the withstand voltage of the plane of section of the laminated metallization film capacitor core.

The present invention will be further described with drawings and embodiments; however an electrode structure of a laminated metallization film capacitor of the present invention is not limited to the embodiments.

DETAILED DESCRIPTION OF THE EMBODIMENTS

Figure 1:
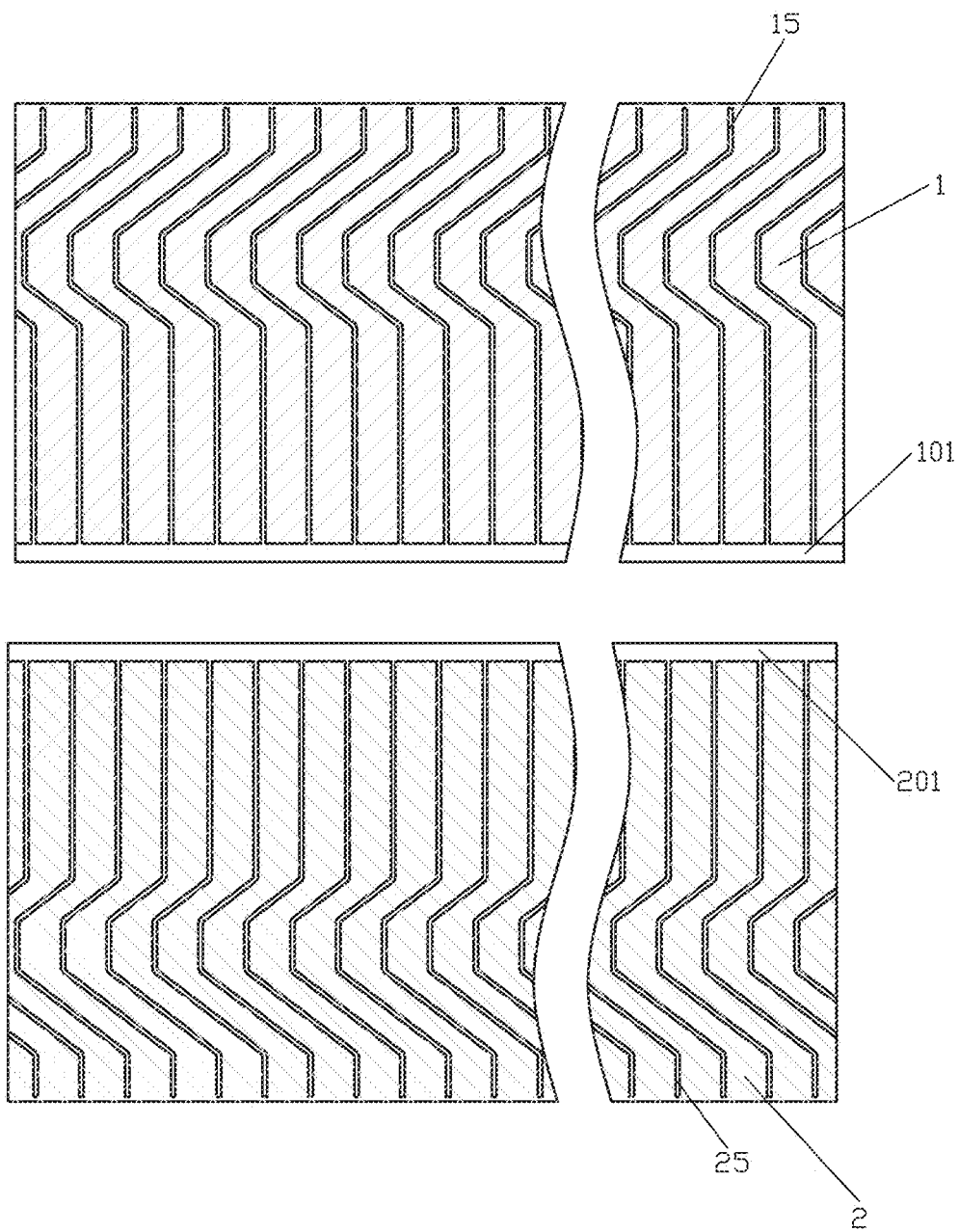
FIG. 1 illustrates a schematic diagram of two separated upper and lower metallization films of a first embodiment of the present invention.
Figure 2:
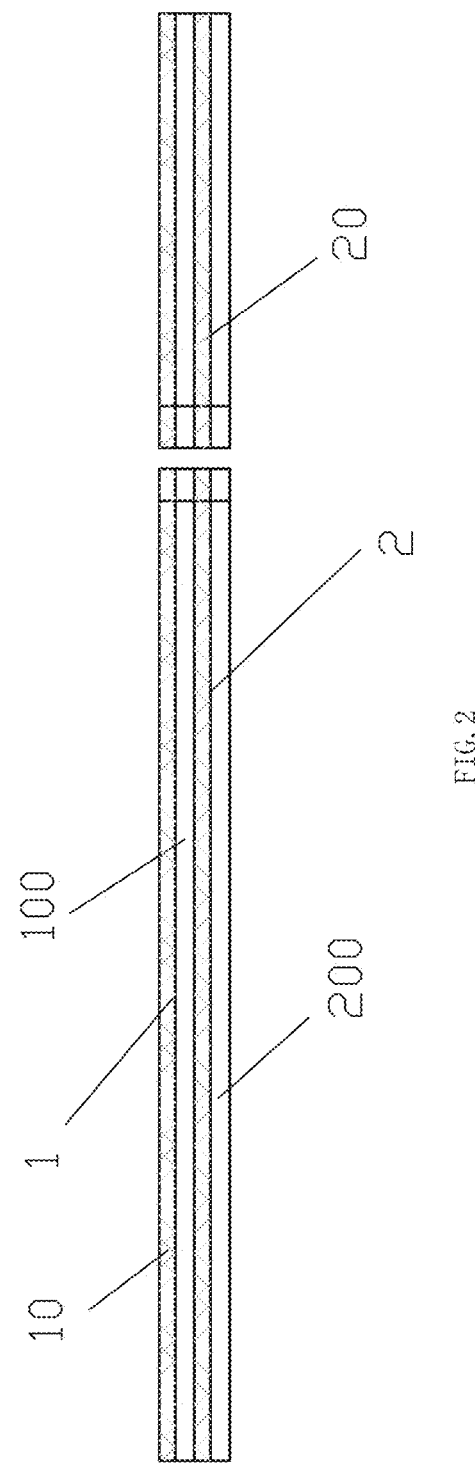
FIG. 2 illustrates a front view of two laminated upper and lower metallization films of the first embodiment of the present invention.
Figure 3:
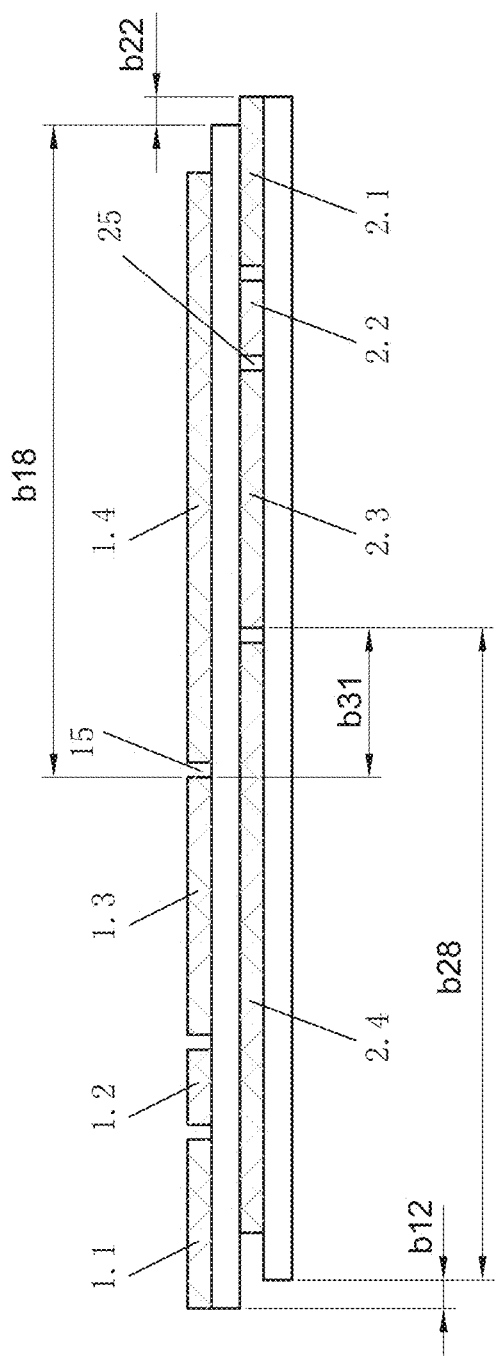
FIG. 3 illustrates a left sectional view of two laminated upper and lower metallization films of the first embodiment of the present invention.
Figure 4:
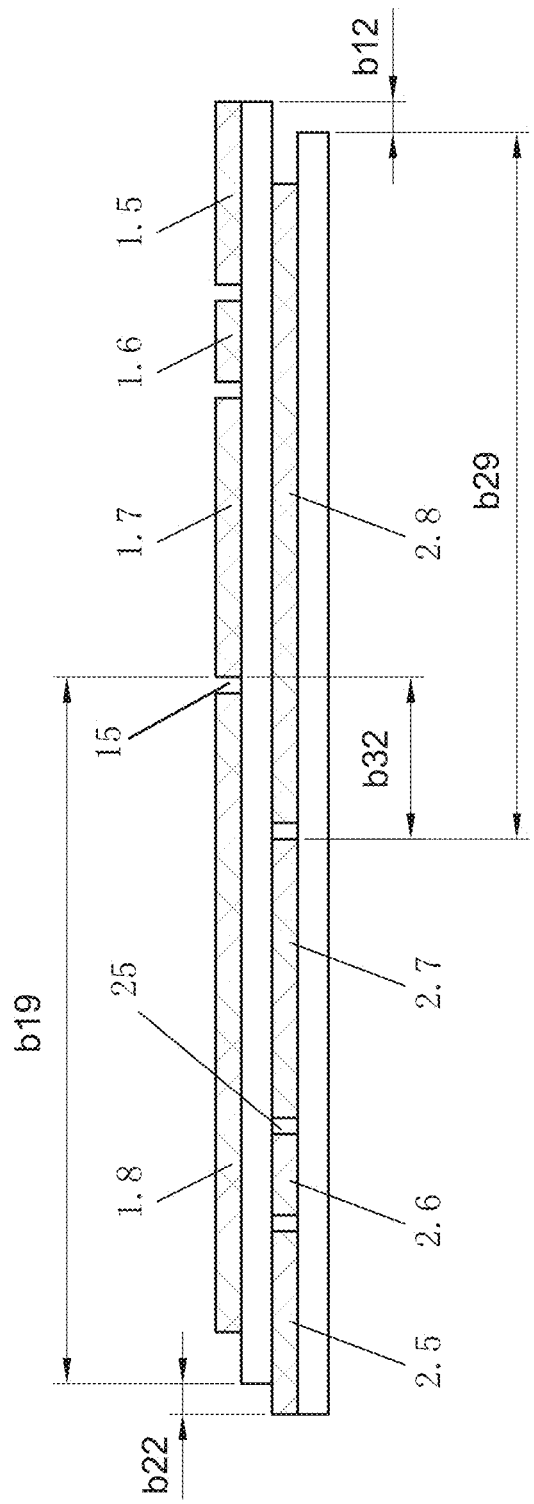
FIG. 4 illustrates a right sectional view of two laminated upper and lower metallization films of the first embodiment of the present invention.
Figure 5:
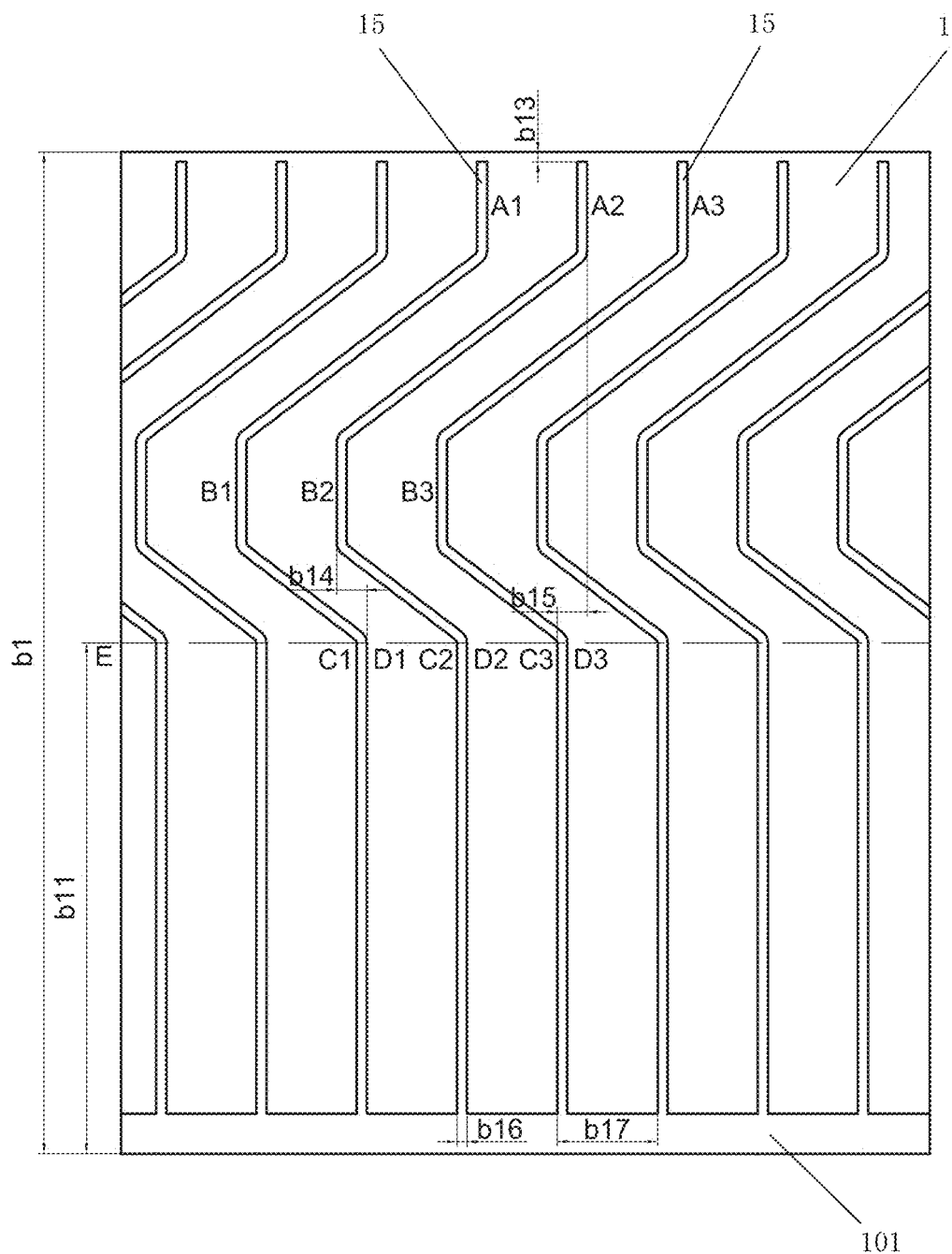
FIG. 5 illustrates a schematic diagram of an upper metallization film of the first embodiment of the present invention.
Figure 6:
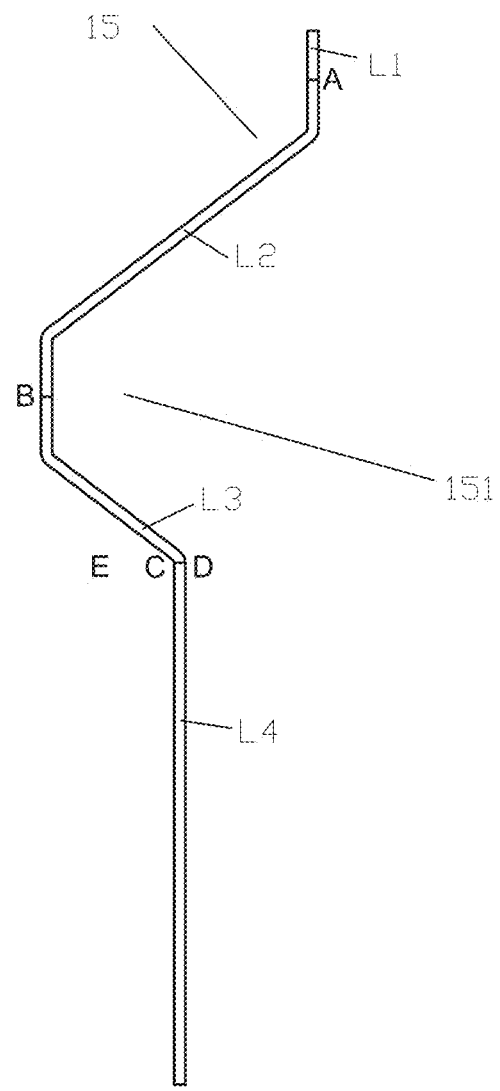
FIG. 6 illustrates a schematic diagram of a curved gap strip of the first embodiment of the present invention.

The first embodiment, refer to FIG. 1 to FIG. 7, an electrode structure of a laminated metallization film capacitor comprises at least two laminated metallization films; two adjacent metallization films are laminated with a preset misalignment width longitudinally; the film width of the upper and lower metallization films is equal, the upper metallization film 1 and the lower metallization film 2 are laminated with a misalignment width b12; each metallization film respectively comprising a conductive metal coating and an insulation dielectric layer, the conductive metal coating is film coated on the insulation dielectric layer; the upper metallization film 1 comprising a conductive metal coating 10 and an insulation dielectric layer 100, the conductive metal coating 10 is film coated on the insulation dielectric layer 100, the lower metallization film 2 comprising a conductive metal coating 20 and an insulation dielectric layer 200, the conductive metal coating 20 is film coated on the insulation dielectric layer 200; each metallization film is disposed with at least a metal-uncoated gap strip with a certain width laterally, the gap strip forms a margin of the metallization film, the upper metallization film 1 is disposed with a margin 101, the lower metallization film is disposed with a margin 201;

each metallization film is further disposed with a plurality of metal-uncoated curved gap strips with a certain width longitudinally to separate two adjacent metal coating units partially or totally; the upper metallization film 1 is further disposed with a plurality of metal-uncoated curved gap strips 15 with a certain width longitudinally to separate two adjacent metal coating units partially or totally, the plurality of curved gap strips 15 form mesh curves in the upper metallization film 1, the lower metallization film 2 is further disposed with a plurality of metal-uncoated curved gap strips 25 with a certain width longitudinally to separate two adjacent metal coating units partially or totally, the plurality of curved gap strips 25 form a mesh in the upper metallization film 2;

Take the first metallization film 1 for example, please refer to FIG. 5 and FIG. 6, a center leaning to one side of the curved gas strip 15 is concaved with a notch 151, the open of the notch faces right, both sides of the notch 151 form like misaligned shoulders; in two adjacent curve gap strips, an leftmost point B of the right curve gap strip is disposed inside the notch 151 of the left curve gap strip in any event.

The width of the curved gap strip is greater than or equal to 0.1 mm; the width of each curved gap strip is equal or unequal, in this embodiment, the width of each curved gap strip is equal.

The curved gap strip 15 comprises a first curved gap strip L1, a second curved gap strip L2, a third curved gap strip L3 and a fourth curved gap strip L4 joined in order as one.

Thereinto, the fourth curved gap strip L4 is a curved section from a preset position E to the margin of the metallization film, the second curved gap strip L2 is a curved section from a leftmost end point of a curved gap strip section removing the fourth curved gap strip to a rightmost end point thereof, that is to say, the second curved gap strip L2 is a curved section from the rightmost end point A of the curved gap strip to the leftmost end point B of curved gap strip;

In this embodiment, the open of the notch of the upper metallization film 1 faces right, so that the first curved gap strip L1 is a curved section from an end to a rightmost end point A of a curved gap strip section removing the fourth curved gap strip, the third curved gap strip L3 is a curved section from a leftmost end point B of a curved gap strip section removing the fourth curved gap strip to the preset position of the curved gap strip.

In two adjacent upper and lower metallization films, the film width of the upper metallization film 1 is set to be b1, the distance from the preset position of the upper metallization film 1 to an film edge in the margin side thereof is set to be b11, the misalignment width of the upper metallization film 1 with respect to the lower metallization film 2 is set to be b12; the film width of the lower metallization film 2 is set to be b2, the distance from the preset position of the lower metallization film 2 to an film edge in the margin side thereof is set to be b21, the misalignment width of the lower metallization film 2 with respect to the upper metallization film 1 is set to be b22; following formulas are satisfied therebetween:

$$b11+b12+b21>b1$$

$$b21+b22+b11>b2$$

In this embodiment, the film width of the two adjacent upper and lower metallization films is equal, so is the width the misalignment widths thereof and a distance from the preset position to a film edge of the margin:

$$b1=b2, b12=b22, b11=b21;$$

$$b11>(b1-b12)/2;$$

$$b21>(b2-b22)/2.$$

An end of the first curved gap strip L1 is joined to the second curved gap strip L2, another end of the first curved gap strip L1 is disposed with a preset distance by an edge of the metallization film or an end of the metallization film. In this embodiment, a present distance b13 is disposed between another end of the first curved gap strip L1 and the edge of the metallization film, other designs are available certainly, in another case, another end of the first curved gap strip L1 passes over the edge of the metallization film, that is to say, b13≥0.

The length of the first curved gap strip L1 is greater than or equal to 0 mm.

The left end point in the preset position of the fourth curved gap strip L4 is set to be C, the right end point in the preset position of the fourth curved gap strip L4 is set to be D.

In two adjacent curved gap strips, as figured in FIG. 5, a leftmost end point B2 of a curved gap strip section formed from a right curved gap strip removing the fourth curved gap strip is on the left of a right end point D1 of the preset position of the fourth curved gap strip of the left curved gap strip; in another case, an leftmost end point B2 of a curved gap strip section formed from a right curved gap strip removing the fourth curved gap strip is aligned with a right end point D1 of the preset position of the fourth curved gap strip of the left curved gap strip, that is to say, $b14 \geq 0$ In two adjacent curved gap strips, as figured in FIG. 15, a rightmost point C3 of the metallization film between two adjacent left and right fourth curved gap strips is on the left of a rightmost end point A2 of a curved gap strip section formed from a left curved gap strip removing the fourth curved gap strip; in another case, a rightmost point C3 of the metallization film between two adjacent left and right fourth curved gap strips is aligned with a rightmost end point A2 of a curved gap strip section formed from a left curved gap strip removing the fourth curved gap strip; that is to say, $b15 \geq 0$.

An end of the fourth curved gap strip L4 is connected to the third curved gap strip L3, another end of the fourth curved gap strip L4 is connected to the margin 101 of the upper metallization film. In this embodiment, the fourth curved gap strip L4 is a straight section vertical to the edge of the metallization film.

In a position relationship of two adjacent mesh curves (curved gap strips), b16 is the width of the curve, b17 is the distance between the mesh curves. $b16 \geq 0.1$ mm, b17 can be unequal, adjacent curves must match the following: $b14 \geq 0$ and $b15 \geq 0$.

In two adjacent upper and lower metallization films, the metal coating of the upper metallization film 1 is connected to a first electrode, the metal coating of the lower metallization film 2 is connected to a second electrode.

On the left plane of section, the metal coating 1.1, the metal coating 1.2, the metal coating 1.3 are connected to the first electrode, the metal coating 1.4 is disconnected to the first electrode. The metal coating 2.1, the metal coating 2.2, the metal coating 2.3 are connected to the second electrode, the metal coating 2.4 is disconnected to the second electrode.

On the right plane of section, the metal coating 1.5 is connected to the first electrode, the metal coating 1.6, the metal coating 1.7, the metal coating 1.8 are disconnected to the first electrode. The metal coating 2.5 is connected to the second electrode, the metal coating 2.6, the metal coating 2.7, the metal coating 2.8 are disconnected to the second electrode.

On the plane of section, the metal coating (1.4, 1.8, 2.4, 2.8) near to the margin is disconnected to the electrode. $b18 \geq b11$, $b19 \geq b11$, $b28 \geq b21$, $b29 \geq b21$.

On the plane of section, the shortest insulation distance of the first electrode and the second electrode is b31, b32.

The upper metallization film is the same as the lower metallization film, so is the preset position E. $b1=b2$, $b12=b22$, $b11=b21$.

$$b31=b18+b28+b12-b1$$

$$b32=b19+b29+b12-b1$$

from $b1=b2$, $b12=b22$, $b11=b21$, $b18 \geq b11$, $b19 \geq b11$, $b28 \geq b21$, $b29 \geq b21$, we conclude that:

$$b31 \geq 2b11+b12-b1$$

$$b32 \geq 2b11+b12-b1$$

in the preset position E, $b11>(b1-b12)/2$ so that: $b31>0$, $b32>0$

On the plane of section, the shortest insulation distance of the first electrode and the second electrode is b31, b32, as designed, b31, b32 are far greater than the thickness of the dielectric between electrodes, the withstand voltage is proportionate to the insulation distance, thus improving the withstand voltage of the plane of section of the laminated metallization film capacitor core.

Figure 7:
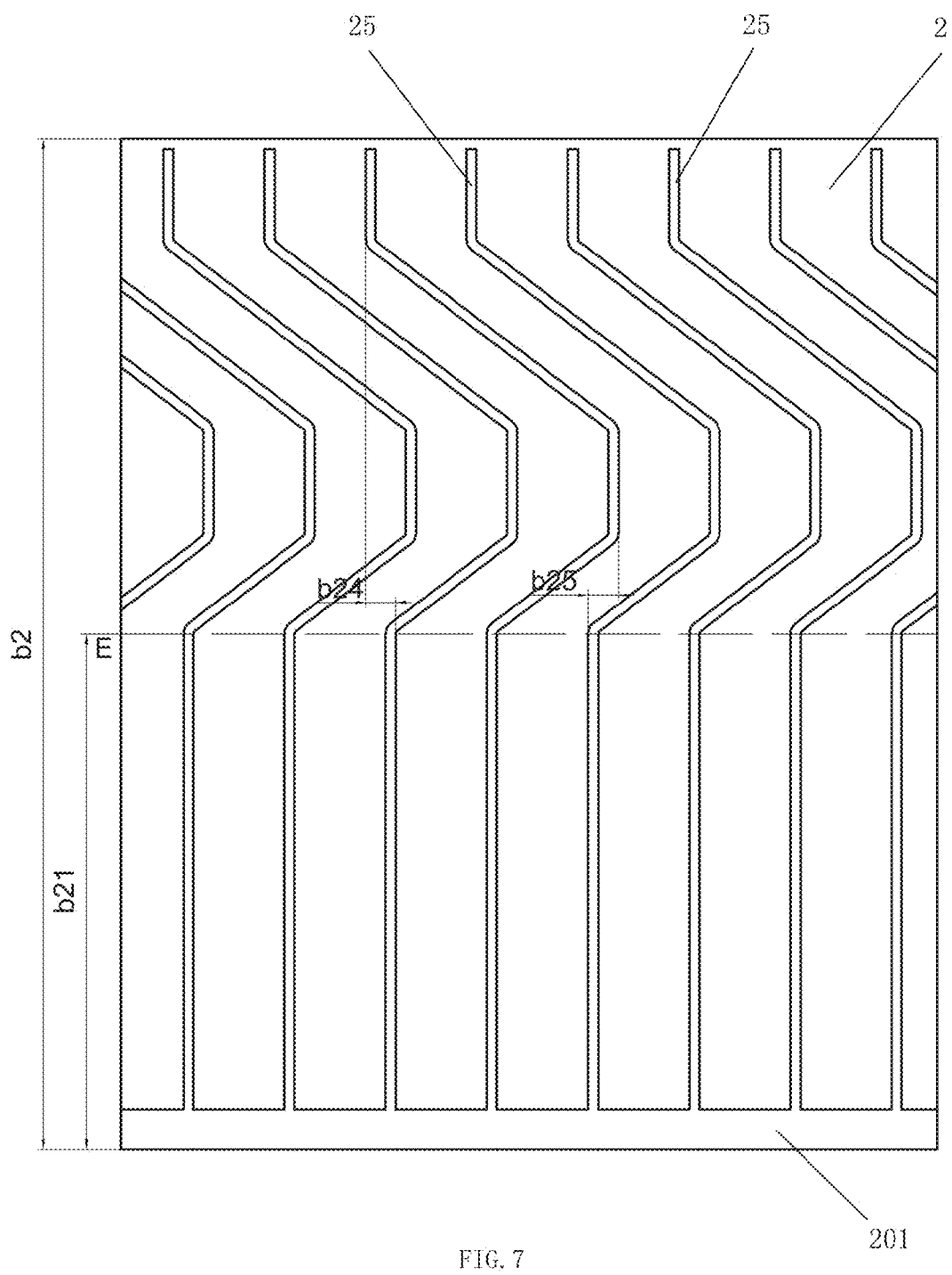
FIG. 7 illustrates a schematic diagram of a lower metallization film of the first embodiment of the present invention.

In this embodiment, in the lower metallization film 2, as figured in FIG. 7, a single metallization film is disposed the margin in the bottom side, so that, the open of the notch of the metallization film 2 faces left; b24 in FIG. 7 and b14 in FIG. 5 have same condition, b25 in FIG. 7 and b15 in FIG. 5 have same condition.

Figure 8:
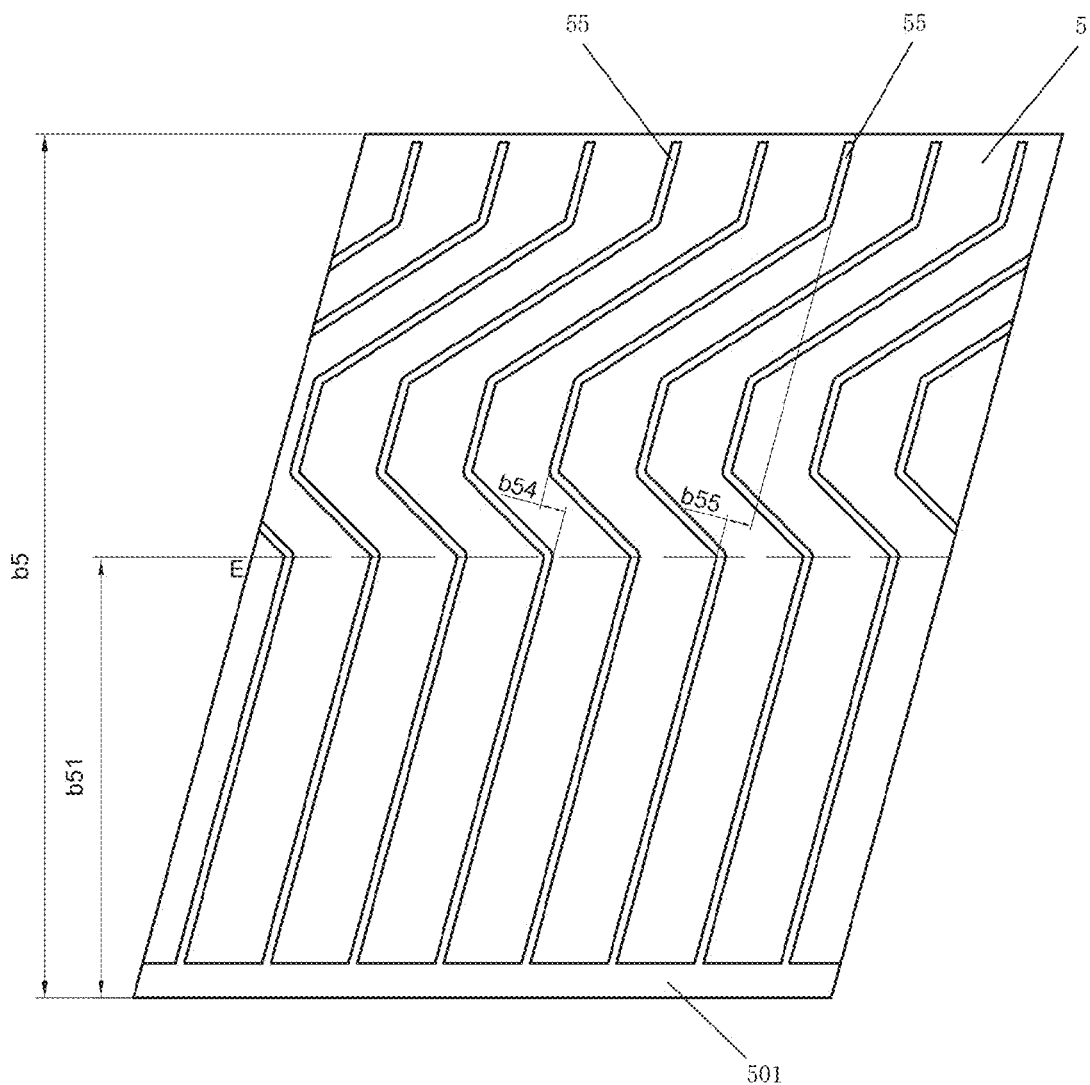
FIG. 8 illustrates a schematic diagram of a metallization film with a preset angle between the plane of section and the longitudinal direction.

In this embodiment, the plane of section of the laminated metallization film capacitor core coincides with the longitudinal direction, that is to say, the preset angle is zero, the curved gap strips are disposed longitudinally. In another case, the curved gap strips are offset at a preset angle to the longitudinal direction, the plane of section of the laminated metallization film capacitor core and the longitudinal direction set at an angle, so that all curved gap strips have an angle to the longitudinal direction (as figured in FIG. 8), the curved gap strips 55 of the metallization film 1, after reservedly distorted, is the same as figured in FIG. 5, so that it corresponds to the condition that the curved gap strips are disposed longitudinally, by this structure, on the plane of section offset to the longitudinal direction, a preset distance of the first electrode and the second electrode exists as well; b5 is the film width of the upper metallization film 1, the distance from the preset position E of the metallization film 5 to the film edge on the margin 501 side is set to be b51.

Figure 9:
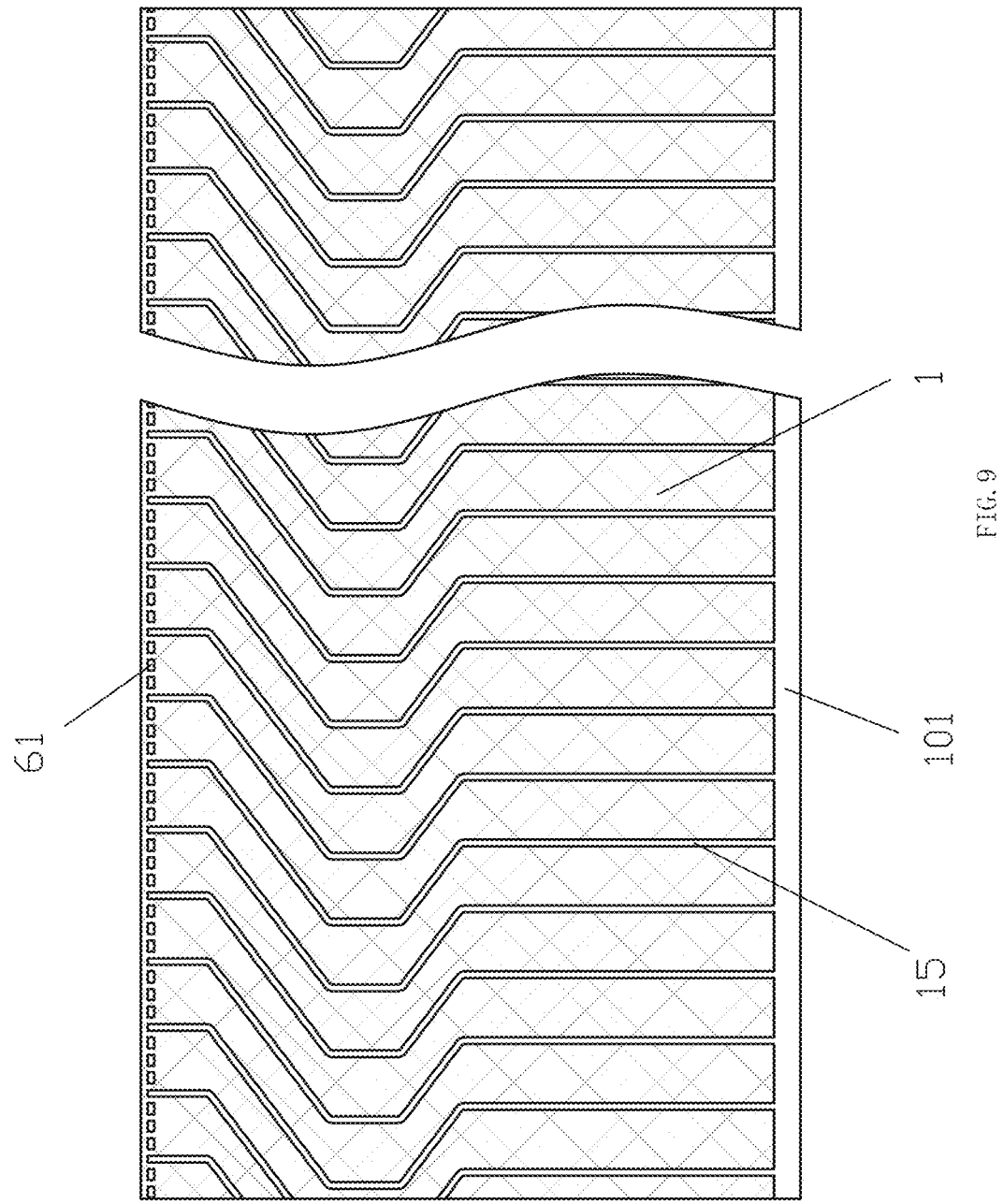
FIG. 9 illustrates a schematic diagram of a metallization film of a second embodiment of the present invention.

The second embodiment, as figured in FIG. 9, the difference of this embodiment of an electrode structure of a laminated metallization film capacitor is that an electrode structure 61 is further disposed between the mesh curves to improve the performance of the products.

Figure 10:
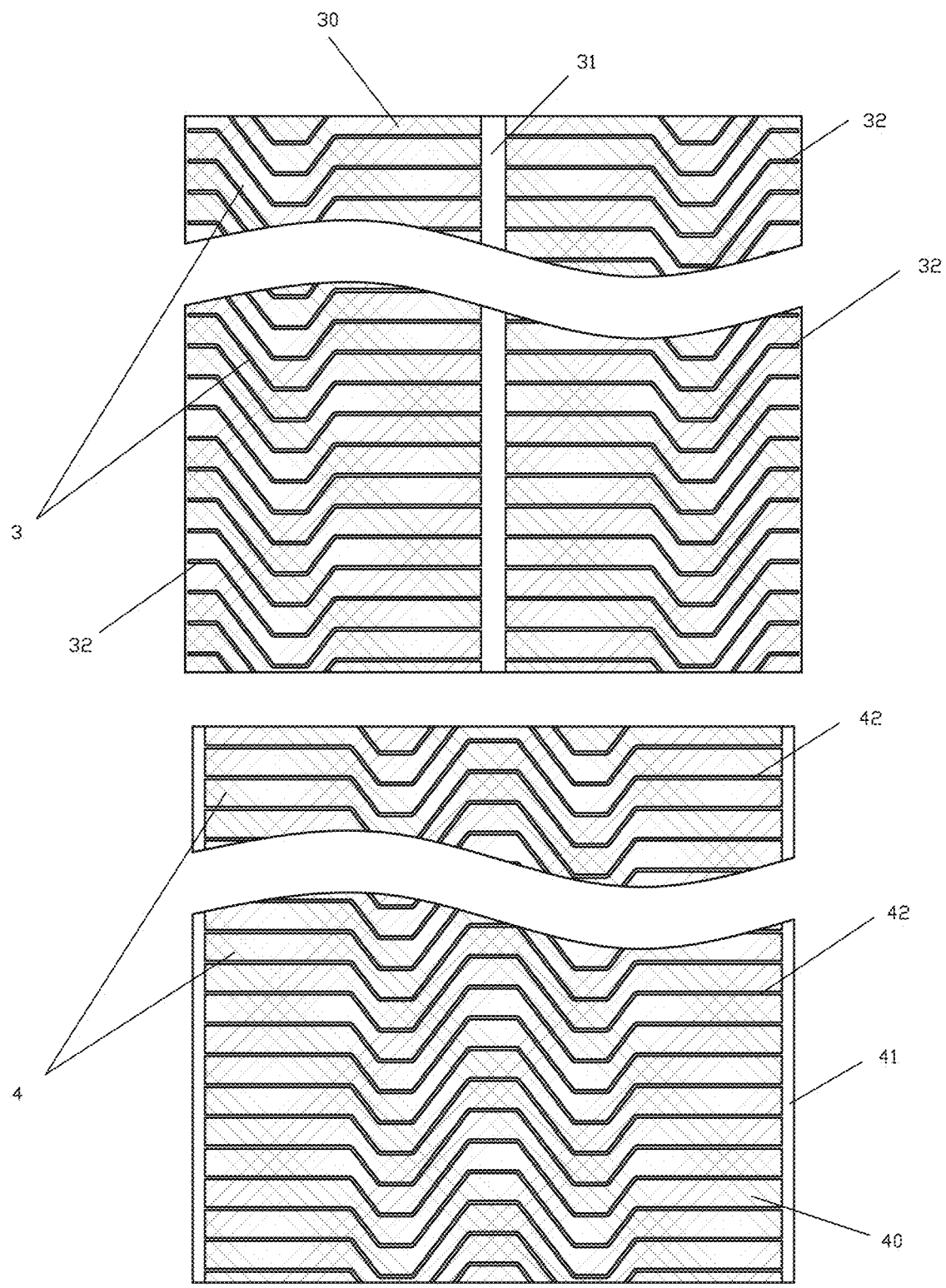
FIG. 10 illustrates a schematic diagram of two separated upper and lower metallization films of a third embodiment of the present invention.
Figure 11:
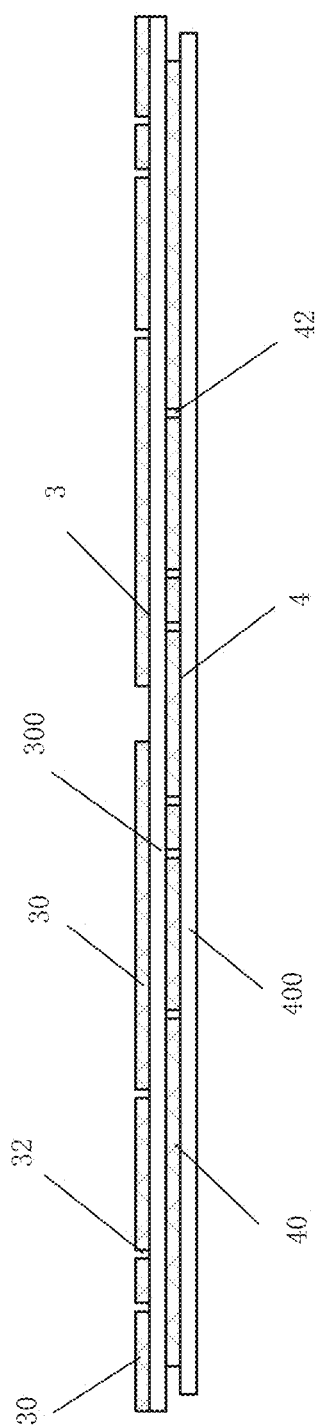
FIG. 11 illustrates a sectional view of two laminated upper and lower metallization films of the third embodiment of the present invention.

The third embodiment, please refer to FIG. 10 and FIG. 11, an electrode structure of a laminated metallization film capacitor is applied in a multiple laminated metallization film capacitor to improve the withstand voltage of the plane of section of the laminated metallization film capacitor core.

In this embodiment, the upper metallization film 3 comprises a conductive metal coating 30 and a insulation dielectric layer 300, the conductive metal coating 30 is film coated on the insulation dielectric layer 300, the lower metallization film 4 comprising a conductive metal coating 40 and an insulation dielectric layer 400, the conductive metal coating 40 is film coated on the insulation dielectric layer 400; the upper metallization film 3 is disposed a longitudinal gap strips 31 in the center, both sides are respectively disposed with a plurality of curved gap strips 32 like the first embodiment; the lower metallization film 4 is disposed a longitudinal gap strips 41 on the both sides, in the center are a plurality of curved gap strips of each are connected by two curved gap strips 42 like the first embodiment.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention enlarges the insulation distance of metallization electrodes in different potentials on the plane of section of the capacitor core, thus improving the withstand voltage of the plane of section of the laminated metallization film capacitor core.

The invention claimed is:

1. An electrode structure of a laminated metallization film capacitor, comprising at least two laminated metallization films; two adjacent metallization films are laminated with a preset misalignment width longitudinally; each metallization film respectively comprising a conductive metal coating and an insulation dielectric layer, the conductive metal coating is film coated on the insulation dielectric layer; each metallization film is disposed with at least a metal-uncoated gap strip with a certain width laterally, the gap strip forms a margin of the metallization film; wherein:

each metallization film is further disposed with a plurality of metal-uncoated curved gap strips with a certain width on the plane of section of the laminated metallization film capacitor core to separate two adjacent metal coating units partially or totally; a center of the curved gas strip is concaved with a notch, both sides of the notch form like misaligned shoulders, a projection forms opposite to the open of the notch; in two adjacent curve gap strips, an extreme point of the projection of one curve gap strip is disposed inside the notch of the other one in any event.

2. The electrode structure of a laminated metallization film capacitor according to claim 1, wherein the opens of notches of the curved gap strips in two adjacent upper and lower metallization films are faced in a same direction or in opposite direction.

3. The electrode structure of a laminated metallization film capacitor according to claim 1, wherein in two adjacent upper and lower metallization films, the metal coating of the upper metallization film is connected to a first electrode, the metal coating of the lower metallization film is connected to a second electrode, a preset distance is disposed between the first electrode and the second electrode on the plane of section.

4. The electrode structure of a laminated metallization film capacitor according to claim 1, wherein the width of each curved gap strip is equal or unequal, the width of the each curved gap strip is greater than or equal to 0.1 mm.

5. The electrode structure of a laminated metallization film capacitor according to claim 1, wherein the curved gap strip comprises a first curved gap strip, a second curved gap strip, a third curved gap strip and a fourth curved gap strip joined in order as one.

6. The electrode structure of a laminated metallization film capacitor according to claim 5, wherein:

the curved gap strips are disposed on the plane of section of the laminated metallization film capacitor core, the plane of section and the longitudinal direction set at a preset angle, when the preset angle is distorted reversely on the plane of section and the curved gap strips, the plane of section and the longitudinal direction coincide, the first curved gap strip, the second curved strip, the third curved strip and the fourth curved gap strip match any of the following:

the fourth curved gap strip is a curved section from a preset position of the curved gap strip to the margin of the metallization film, the second curved gap strip is a curved section from a leftmost end point of a curved gap strip section removing the fourth curved gap strip to a rightmost end point thereof;

when the open of the notch faces left, the first curved gap strip is a curved section from an end to a leftmost end point of a curved gap strip section removing the fourth curved gap strip, the third curved gap strip is a curved section from a rightmost end point of a curved gap strip section removing the fourth curved gap strip to the preset position of the curved gap strip;

when the open of the notch faces right, the first curved gap strip is a curved section from an end to a rightmost end point of a curved gap strip section removing the fourth curved gap strip, the third curved gap strip is a curved section from a leftmost end point an curved gap strip section removing the fourth curved gap strip to the preset position of the curved gap strip.

7. The electrode structure of a laminated metallization film capacitor according to claim 6, wherein in two adjacent upper and lower metallization films, the film width of the upper metallization film is set to be $b1$, the distance from the preset position of the upper metallization film to an film edge in the margin side is set to be $b11$, the misalignment width of the upper metallization film with respect to the lower metallization film is set to be $b12$; the film width of the lower metallization film is set to be $b2$, the distance from the preset position of the lower metallization film to an film edge in the margin side is set to be $b21$, the misalignment width of the lower metallization film with respect to the upper metallization film is set to be $b22$;

following formulas are satisfied therebetween:

$$b11+b12+b21>b1$$

$$b21+b22+b11>b2$$

When the film width of the two adjacent upper and lower metallization films is equal, so is the width the misalignment widths thereof and a distance from the preset position to a film edge of the margin:

$$b1=b2, b12=b22, b11=b21;$$

$$b11>(b1-b12)/2;$$

$$b21>(b2-b22)/2.$$

8. The electrode structure of a laminated metallization film capacitor according to claim 6, wherein an end of the first curved gap strip is joined to the second curved gap strip, another end of the first curved gap strip is disposed with a preset distance by an edge of the metallization film or an end of the metallization film;

the preset distance is greater than or equal to 0 mm;

the length of the first curved gap strip is greater than or equal to 0 mm.

9. The electrode structure of a laminated metallization film capacitor according to claim 6, wherein in two adjacent curved gap strips:

whatever direction the notch faces, an leftmost end point of a curved gap strip section formed from a right curved gap strip removing the fourth curved gap strip is aligned with a right end point of the preset position of the fourth curved gap strip of the left curved gap strip, or a leftmost end point of a curved gap strip section formed from a right curved gap strip removing the fourth curved gap strip is on the left of a right end point of the preset position of the fourth curved gap strip of the left curved gap strip;

whatever direction the notch faces, a rightmost end point of a curved gap strip section formed from a left curved gap strip removing the fourth curved gap strip is aligned with a left end point of the preset position of the fourth curved gap strip of the right curved gap strip, or a rightmost end point of a curved gap strip section formed from a left curved gap strip removing the fourth curved gap strip is on the right of a left end point of the preset position of the fourth curved gap strip of the right curved gap strip.

10. The electrode structure of a laminated metallization film capacitor according to claim 6, wherein an end of the fourth curved gap strip is joined to the third curved gap strip, another end of the fourth curved gap strip is connected to the margin of the metallization film;

Whatever direction the notch faces, a rightmost point of the metallization film between two adjacent left and right fourth curved gap strips is aligned with a rightmost end point of a curved gap strip section formed from a left curved gap strip removing the fourth curved gap strip; or a rightmost point of the metallization film between two adjacent left and right fourth curved gap strips is on the left of a rightmost end point of a curved gap strip section formed from a left curved gap strip removing the fourth curved gap strip;

Whatever direction the notch faces, a leftmost point of the metallization film between two adjacent left and right fourth curved gap strips is aligned with a leftmost end point of a curved gap strip section formed from a right curved gap strip removing the fourth curved gap strip; or a leftmost point of the metallization film between two adjacent left and right fourth curved gap strips is on the right of a leftmost end point of a curved gap strip section formed from a right curved gap strip removing the fourth curved gap strip.

* * * * *